(12) United States Patent
Renes

(10) Patent No.: US 7,653,199 B2
(45) Date of Patent: Jan. 26, 2010

(54) QUANTUM KEY DISTRIBUTION

(75) Inventor: Joseph M. Renes, Erlangen (DE)

(73) Assignee: STC. UNM, Albuquerque, NM (US)

( * ) Notice: Subject to any disclaimer, the term of this patent is extended or adjusted under 35 U.S.C. 154(b) by 790 days.

(21) Appl. No.: 11/194,092

(22) Filed: Jul. 29, 2005

(65) Prior Publication Data

US 2007/0076871 A1    Apr. 5, 2007

Related U.S. Application Data

(60) Provisional application No. 60/592,109, filed on Jul. 29, 2004.

(51) Int. Cl.
*H04L 9/00* (2006.01)

(52) U.S. Cl. .................. 380/256; 380/255; 380/277; 380/278

(58) Field of Classification Search ............... 380/255, 380/256, 277, 278
See application file for complete search history.

(56) References Cited

U.S. PATENT DOCUMENTS

| 2005/0036624 | A1* | 2/2005 | Kent et al. | 380/277 |
| 2006/0059347 | A1* | 3/2006 | Herz et al. | 713/176 |

OTHER PUBLICATIONS

NIST News Release, "Background on Quantum Key Distribution", Apr. 29, 2004.*

Phoenix et al., "Three-state Quantum Cryptography", Jul. 8, 1999, Journal of Modern Optics, 2000, vol. 47, No. 2/3, 507-516.*

Gottesman et al.,"Proof of Security of Quantum Key Distribution with Two-Way Classical Communications", Feb. 2003, IEEE Transactions on Information Theory, vol. 49, No. 2.*

Vittorio, "Quantum Cryptography: Privacy through Uncertainty", Oct. 2002.*

Tanceveski, et al. "Evaluation of the Cost of Error-Correction Protocol in Quantum Cryptographic Transmission", 1998, Proc. SPIE, vol. 3228, 322.*

Srikanth et al. "BB84 Quantum Key Distribution Protocol based on Classical Error Correction", 2002, DRDO-IISc Programme on Advanced Research in Mathematical Engineering.*

Acin, Antonio , et al., "Bell's inequalities detect efficient entanglement", *Proceedings of EQIS'03*, quant-ph/0310166,(2003),1-9.

Acin, A. , et al., "Equivalence between two-qubit entanglement and secure key distribution", *Physical Review Letters*, 91(16), (Oct. 17, 2003),167901/1-4.

Benedetto, J. J., et al., "Finite normalized tight frames", *Advances in Computational Mathematics*, 18(2-4), (2003),357-85.

Bennett, C. H., "Quantum Cryptography: Public Key Distribution and Coin Tossing", *Proceedings of the IEEE International Conference on Computers, Systems, and Signal Processing*, (1984),175-179.

(Continued)

*Primary Examiner*—Carl Colin
*Assistant Examiner*—Lisa Lewis
(74) *Attorney, Agent, or Firm*—Schwegman, Lundberg & Woessner, P.A.

(57) ABSTRACT

Apparatus and methods for establishing a secret key to encrypt and share data using quantum signals represented by an equiangular spherical code and using classical signals in authenticating the key.

33 Claims, 3 Drawing Sheets

OTHER PUBLICATIONS

Biham, Eli, et al., "A proof of the security of quantum key distribution (extended abstract)", *Proceedings of the Thirty-Second Annual ACM Symposium on Theory of Computing*, (2000),715-724.

Bruss, Dagmar, "Optimal eavesdropping in quantum cryptography with six states", *Phys.Rev.Lett.*, 81, (1998),3018-3021.

Bruss, Dagmar, et al., "Tomographic Quantum Cryptography: Equivalence of Quantum and Classical Key Distillation", *Physical Review Letters*, 91, (2003),097901/1-4.

Cerf, Nicolas J., "Asymmetric quantum cloning in any dimension", *Journal of Modern Optics*, 47(2/3), (Feb.-Mar. 2000),187-209.

Cerf, N. J., et al., "Security of quantum key distribution using d-level systems", *Physical Review Letters*, 88(12), (Mar. 25, 2002),127902/1-4.

Clarke, Roger B., et al., "Experimental realization of optimal detection strategies for overcomplete states", *Physical Review A*, 64, (May 5, 2001),012303/1-13.

Csiszar, I., et al., "Broadcast channels with confidential messages", *IEEE Transactions on Information Theory, IT-24*(3), (339-48),May 1978.

Curty, Marcos, et al., "Entanglement as precondition for secure quantum key distribution", *Physical Review Letters*, 92, quant-ph/0307151,(2004),217903/1-5.

Davies, E., "Information and quantum measurement", *IEEE Transactions on Information Theory*, 24(5), (Sep. 1978),596-599.

Fuchs, Christopher A., et al., "Optimal eavesdropping in quantum cryptography. I. Information bound and optimal strategy", *Physical Review A*, 56, (Aug. 1997),1163-1172.

Fuchs, C. A., "Squeezing quantum information through a classical channel: measuring the ""quantumness"" of a set of quantum states", *Quantum Information and Computation*, 3(5), (Sep. 2003),377-404.

Gisin, N., et al., "Quantum Cryptography on Noisy Channels: Quantum versus Classical Key-Agreement Protocols", *Physical Review Letters*, 83(20), (Nov. 15, 1999),4200-4203.

Huttner, B., et al., "Information gain in quantum eavesdropping", *Modern Optics*, 41(12), (Dec. 1994),2455-66.

Lo, Hoi-Kwong, et al., "Unconditional Security of Quantum Key Distribution over Arbitrarily Long Distances", *Science*, 283(5410), (Mar. 26, 1999),2050-6.

Lutkenhaus, Norbert, "Security against eavesdropping in quantum cryptography", *Physical Review A*, 54, (Jul. 1996),97-111.

Maurer, U. M., "Secret key agreement by public discussion from common information", *IEEE Transactions on Information Theory*, 39(3), (May 1993),733-742.

Mayers, Dominic, "Unconditional security in Quantum Cryptography", *Journal of the ACM*, 48(3), quant-ph/9802025.,(2001),351-406.

Phoenix, Simon J., et al., "Three-state quantum cryptography", *Journal of Modern Optics*, 47(2-3), (Feb.-Mar. 2000),508-516.

Renes, Joseph, "Frames, designs, and spherical codes in quantum information theory", *The University of New Mexico Ph.D. Dissertation*, (2004),180 pages.

Renes, Joseph M., et al., "Quantum Key Distribution Using Equiangular Spherical Codes", quant-ph/0311106, http://arxiv.org/PS_cache/quant-ph/pdf/0311/0311106.pdf,(Jan. 14, 2004),1-4.

Renes, Joseph M., et al., "Symmetric Informationally Complete Quantum Measurements", *J. Math. Phys.* 45, (2004),2171-2180.

Sasaki, Masahide, et al., "Accessible information and optimal strategies for real symmetrical quantum sources", *Physical Review A*, 59(5), (May 1999),3325-3335.

Shor, Peter W., et al., "Simple Proof of Security of the BB84 Quantum Key Distribution Protocol", *Physical Review Letters,*, (Jul. 10, 2000),441-444.

Strohmer, Thomas, et al., "Grassmannian frames with applications to coding and communication", *Applied and Computational Harmonic Analysis*, 14(3), (May 2003),257-275.

Wootters, W. K., et al., "Optimal state-determination by mutually unbiased measurements", *Annals of Physics*, 191(2), (May 1, 1989),363-81.

\* cited by examiner

QUANTUM KEY DISTRIBUTION

RELATED APPLICATION

This application claims priority under 35 U.S.C. 119(e) from U.S. Provisional Application Ser. No. 60/592,109 filed 29 Jul. 2004, which application is incorporated herein by reference.

GOVERNMENT INTEREST STATEMENT

This invention was made with Government support under Contract N0014-00-1-0578 awarded by the United States Office of Naval Research. The Government has certain rights in the invention.

FIELD OF THE INVENTION

This invention relates generally to communications, in particular, to quantum key distribution.

BACKGROUND OF THE INVENTION

Aspects of quantum physics are being used in an approach to provide secure communication. Quantum cryptography applies the physics of information rather than relying on various mathematical techniques of traditional cryptography to restrict eavesdroppers from learning the contents of encrypted messages. Eavesdropping can be detected using quantum phenomena because measurements on the quantum carrier of information made by an eavesdropper disturb it, leaving traces of the disturbance.

LITERATURE

[1] C. H. Bennett and G. Brassard, in *Proceedings of the IEEE International Conference on Computers, Systems, and Signal Processing* (IEEE, New York, 1984), p. 175.
[2] D. Mayers, quant-ph/9802025.
[3] D. Bruβ, Phys. Rev. Lett. 81, 3018 (1998).
[4] W. K. Wootters and B. D. Fields, Ann. Phys. (N.Y.) 191, 363 (1989).
[5] N. J. Cerf, M. Bourennane, A. Karlsson, and N. Gisin, Phys. Rev. Lett. 88, 127902 (2002).
[6] I. Csiszár and J. Körner, IEEE Trans. Inf. Theory, IT-24, 339 (1978).
[7] U. M. Maurer, IEEE Trans. Inf. Th. 39, 733 (1993).
[8] N. Gisin and S. Wolf, Phys. Rev. Lett. 83, 4200 (1999).
[9] T. Strohmer and R. Heath, Appl. Comp. Harm. Anal. 14, 257 (2003).
[10] J. J. Benedetto and M. Fickus, Adv. Comput. Math. 18, 357 (2003).
[11] J. M. Renes, R. Blume-Kohout, A. J. Scott, and C. M. Caves, quant-ph/0310075.
[12] C. A. Fuchs and M. Sasaki, Quant. Info. Comp. 3, 377 (2003).
[13] C. A. Fuchs et al., Phys. Rev. A 56, 1163 (1997).
[14] A. Acín, L. Masanes, and N. Gisin, Phys. Rev. Lett. 91, 167901 (2003).
[15] M. Curty, M. Lewenstein, and N. Lütkenhaus, quant-ph/0307151.
[16] A. Acín, N. Gisin, L. Masane, and V. Scarani, quant-ph/0310166.
[17] J. M. Renes, quant-ph/0311106.
[18] S. J. D. Phoenix, S. M. Barnett, and A. Chefles, J. Mod. Opt. 47, 507 (2000).
[19] A. Ekert and B. Huttner, J. Mod. Opt. 41, 2455 (1994).
[20] N. Lütkenhaus, Phys. Rev. A 54, 97 (1996).
[21] R. B. M. Clarke, et al., Phys. Rev. A 64 012303 (2001).
[22] N. J. Cerf, J. Mod. Opt. 47, 187 (2000).
[23] P. W. Shor and J. Preskill, Phys. Rev. Lett. 85, 441 (2000).
[24] C. A. Fuchs et al., Phys. Rev. A 56, 1163 (1997).
[25] D. Mayers, J. Assoc. Comput. Mach. 48, 351 (2001).
[26] E. Biham et al., in Proc. 32nd Annual ACM Symposium on the Theory of Computing (STOC), ACM Press, New York (2000), p. 715.
[27] H.-K. Lo and H. F. Chau, Science 283, 2050 (1999).
[28] Dagmar Bruβ, et al., Phys. Rev. Lett. 91, 097901 (2003)
[29] M. Sasaki, et al., Phys. Rev. A 59, 3325 (1999).
[30] E. B. Davies, IEEE Trans. Inf. Theory 24, 596 (1978).

All publications listed above are incorporated by reference herein, as though individually incorporated by reference.

BRIEF DESCRIPTION OF THE DRAWINGS

Embodiments and features of the present invention will be set forth in part in the description that follows, and in part will become apparent to those skilled in the art by reference to the following description of the invention and referenced drawings. The aspects, advantages, and features of the invention may be realized and attained by means of the instrumentalities, procedures, and combinations pointed out in these embodiments and their equivalents.

DETAILED DESCRIPTION

Figure 1:
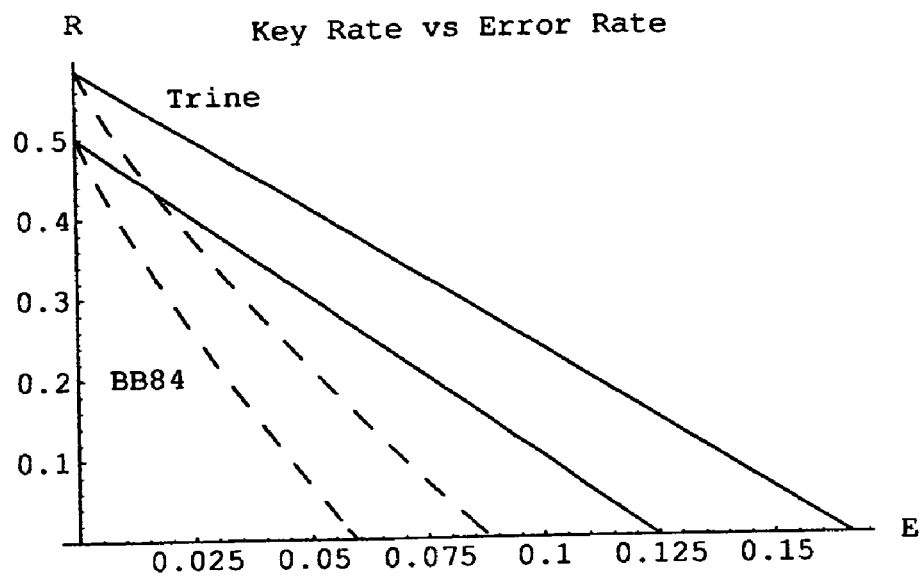
FIG. 1 shows the upper and lower key generation rate bounds for a trine protocol and BB84 protocol as a function of error rate.

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments are not necessarily mutually exclusive, as some embodiments may be combined with one or more other embodiments to form new embodiments. The following detailed description is, therefore, not to be taken in a limiting sense, and the scope of the embodiments of the present invention is defined only by the appended claims, along with the full scope of equivalents to which such claims are entitled.

In an embodiment, a shared secret key may be established between parties using a quantum channel to establish a raw key in conjunction with a classical channel to provide authentication in order to establish the shared secret key. Herein, a classical channel refers to a standard medium for transmission of information as opposed to a channel configured to communicate based on principles of quantum communications. Classical signals are signals formatted typically for transmission in a classical channel. A quantum channel is a means by which quantum signals may be directly exchanged. Quantum signals are signals constructed based on principles of quantum communications typically for transmission in a quantum channel. In an embodiment, quantum signals may be constructed using equiangular spherical codes. In the following discussions, the terms Alice and Bob represent parties that wish to communicate using a shared secret key and the term Eve presents that a party or parties that wish to eavesdrop on the communication between Alice and Bob. Parties may be realized as apparatus and/or systems.

Two parties, traditionally called Alice and Bob, wish to establish a shared secret key by using an insecure quantum channel and an authenticated classical broadcast channel. The quantum channel is a means by which quantum signals may be directly exchanged, but it is insecure because Alice and Bob do not have total control over it. The classical channel need not be controlled by the two parties, but each party must be able to authenticate messages sent by the other. Using these two resources, they proceed as follows, in what is termed a prepare and measure protocol. Alice initiates the protocol by preparing quantum signals and sending them to Bob via the quantum channel. Bob then measures them in some prescribed way and acknowledges receipt via the classical channel. At this point both Alice and Bob have created a putative key, the string of transmitted signals for Alice and the string of measurement results for Bob. Now they discontinue use of the quantum channel and begin a purely classical phase of the protocol.

In quantum key distribution (QKD), the quantum signals sent by Alice cannot, in general, be read by an eavesdropper (traditionally named Eve) without altering them. By comparing the record of measurement results with the record of the signals transmitted, the eavesdropper's actions may be revealed. Further, the amount of disturbance caused to the signals enables the two legitimate parties to infer how much information about either version of the key Eve has or could have in principle gathered from her efforts. They may then process their keys by exchanging messages over the classical channel so as to remove discrepancies between the two versions and eliminate Eve's knowledge of the final key. Herein, the two original versions of the key shall be referred to as the raw key and the process of converting them into the final form shall be referred to as distillation.

In various embodiments, protocols established in accordance with the teachings herein may be used to obtain the raw key. In an embodiment, the procedures for key distillation that are similar or essentially the same as with other protocols may be used, and are therefore left largely intact. The quantum signals Alice uses for transmission may be represented by elements of a complex-dimensional vector space, here taken to have finite dimension, d. The signals may be named $|\phi_j\rangle$, elements of $C^d$ having unit norm. In an embodiment, the set of possible signals may be given by an equiangular spherical code (ESC). An ESC is simply a collection of n quantum states, where $d < n \leq d^2$, satisfying the rule that $$|\langle\phi_j|\phi_k\rangle|^2 = \frac{n-d}{d(n-1)} \quad \forall\, j \neq k \quad (1)$$

Hence, the states are termed equiangular since the angle between every pair is fixed.

Meanwhile, Bob is concerned with which measurement to make. The outcomes of any physically-permissible measurement may be represented by a collection of positive semidefinite operators $\{E_j\}$ on the vector space, subject to the constraint that $$\sum_j E_j = I,$$

where I is the identity operator on $C^d$. Each operator is associated to an individual outcome of the experiment, in such a way that the conditional probability of the kth outcome, given that the jth signal was input to the device, is given by the rule $p_{k|j} = \langle\phi_j|E_k|\phi_j\rangle$.

In an embodiment, two protocols correspond to two different choices of measurement Bob could make. The first protocol reuses the states that Alice used for the encoding phase, for it can be shown that the operators $$E_j = \frac{d}{n}|\phi_j\rangle\langle\phi_j|$$

obey the condition summation condition required for legitimate measurements. Now the conditional probability of Bob's outcome being k, given Alice's choice of signal j, reduces to $$p_{k|j} = \frac{d}{n}|\langle\phi_j|\phi_k\rangle|^2 = \begin{cases} \dfrac{d}{n} & j = k, \\ \dfrac{n-d}{n(n-1)} & j \neq k, \end{cases} \quad (2)$$

The conditional probability will differ slightly for a noisy channel, but the point is that the most probable outcome corresponds to the signal Alice sent. In this scheme, Bob's measurement attempts to confirm which state was sent, albeit with some unavoidable probability of misidentification, so protocols based on this measurement will be termed confirmation protocols. The second protocol available to Bob does the opposite, revealing a certain subset of signals which were certainly not sent. This works by constructing measurement operators $E_j$ which have zero conditional probability of occurrence for the signals in the given subset. That is, if a specific subset of signals, called $\sigma_j$, is fixed and the operator $E_j$ satisfies $$\langle\phi_k|E_j|\phi_k\rangle = 0 \quad \forall k \in \sigma_j, \quad (3)$$

in addition to satisfying the other measurement constraints. This way, the conditional probability of the jth measurement outcome is zero for any signal in the subset $\sigma_k$, meaning that when that outcome obtains, it is certain that none of the corresponding signals were sent. That's only strictly true for a noiseless channel, but if the noise level is not too high, the probability will be nearly zero.

Finding these operators may be straight-forward, a subset $\sigma_k$ may be picked letting $E_j$ be the projection onto the complement of its span. Relative to the discussion herein, it can be shown that for any collection of d equiangular spherical code states, the set is linearly independent, where the subsets are limited to contain $1 < b \leq d-1$ elements. For a fixed value of b in this range, there are then $\binom{n}{b}$ possible subsets $\sigma_k$ and measurement operators $E_k$. By exploiting this zero conditional probability, this measurement doesn't suffer from the omnipresent chance of misidentification that the direct confirmation measurement does. Here each outcome unambiguously identifies a certain subset of which the signal is not a member. Instead, it can be shown that in order to comprise a legitimate measurement to the collection of $E_j$s so constructed, an additional operator must be added. This extra element is used only when needed to satisfy the sum condition for measurements, and when it obtains gives Bob absolutely no information about the signal. For equiangular spherical codes, however, it can be shown that this extra element is unnecessary, so that Bob will always obtain an informative outcome. This won't reveal everything to Bob, of course, but he may simply ask Alice (over the classical channel) for the information he's missing. Because this measurement specifically repudiates some of the potential signals, protocols using it are termed repudiation protocols.

Confirmation protocols and repudiation protocols may each be considered to have three phases to each. The first phase makes use of the quantum channel. Afterwards all messages sent between the two parties are made over the classical broadcast channel, and are thus in principle available to Eve. In the second phase Alice and Bob reduce errors from the raw keys, while at the same time establishing the noise rate of the channel. This may use this quantity to determine Eve's information about the key, which they may combat in phase three.

In an embodiment, in the confirmation protocol Alice begins by randomly generating a string A of N numbers between 0 and n−1. This is her raw key and serves to determine the encoding of each quantum signal. She prepares the states according to A and sends them to Bob over the quantum channel, who then acknowledges their receipt over the classical channel. Bob then implements the confirmation measurement, obtaining a string B of N measurement outcomes, each of which is also a number between 0 and n−1. This is his raw key. This concludes phase one of the protocol.

Alice begins phase two by selecting a number m between 0 and n−3. For each signal, she then randomly chooses m letters she didn't send, and transmits this information to Bob. Bob then takes the list and compares to his string B. If any of the letters Alice claims to have not sent appear in his raw key, he notes this position and removes the letter from his raw key. Letters passing the test are relabelled from 0 to n−m−1, keeping to the original ordering. In this fashion he builds up a binary string E by recording the offending positions with a 1. When the comparison is finished, he sends this string back to Alice, who removes the offending letters from her raw key A, and relabels the surviving letters in the same fashion.

This process serves two purposes. First, it removes errors (differences) from the strings, though depending on the noise level of the channel, some will remain. Second, the rate of errors uncovered at this stage determines the noise rate of the channel, a quantity Alice and Bob estimates before they may proceed to the next step. The ability to determine the noise rate in this manner depends on the value of m that Alice chose in the previous step, and it may work as follows.

Let's assume that the noise in the quantum channel is described as a depolarizing channel, that is, one which completely scrambles any input signal with some probability q. Noise is unavoidable in the quantum channel, and, as Alice and Bob don't control it, they must attribute all the noise to Eve's interference. Assuming this particular form for the channel prevents this from being a completely general analysis, but it illustrates the workings of the protocol which may be modified mutatis mutandis for any given noise model. The probability to detect a discrepancy between the two strings may be broken down in the following manner. If the signal is transmitted faithfully, with probability, 1−q, the chance that Bob's outcome will differ from the Alice's signal is (n−d)/n. If the state is scrambled, this probability is instead (n−1)/n, making for a total disagreement probability of (n−d)/n+q(d−1)/n. The further probability of the discrepancy being discovered is m/(n−1) which may be computed from the ratio of the number of strings containing Bob's outcome ($\binom{n-2}{m-1}$) to the total number of strings ($\binom{n-1}{m}$). Thus the total probability of discovering a discrepancy in the strings, given that the quantum signal was successfully transmitted, is given by $$p_{discrepancy} = \frac{m}{n(n-1)}[n-d+q(d-1)]. \quad (4)$$

With long enough strings, the fraction w of 1s in Bob's string E approximates this quantity quite well, so that Alice and Bob may compute q according to $$q = \frac{n(n-1)w - m(n-d)}{m(d-1)}, \quad (5)$$

unless m=0, in which case they must resort to direct comparison. Estimating q in this way may be accomplished by Alice and Bob publicly revealing a portion of their raw keys (i.e. sacrifice these parts) and find the disagreement rate. This is in turn is approximately equal to the quantity (n−d)/n+q(d−1)/n, from which q may be estimated.

This estimate may now be used to determine the amount of information Eve could know about the raw keys, which will be used to distill a final key about which Eve has zero knowledge in the next and final phase. First, consider another feature of the protocol as constructed: adaptability. Suppose Alice and Bob complete phases one and two and find that Alice has chosen a value of m such that Eve's information is extremely small. This is, of course, great news, but if their raw keys have become very short in the process, they aren't able to exploit the quantum channel very efficiently. This may be changed in the next round, however, by altering the value of m. In principle, Alice may use the results of the previous round to determine the optimal value of m, that value which yields the longest length final key, and use it in the subsequent round. This way the protocol may adapt to a varying noise rate in the quantum channel, all without requiring Alice and Bob to make any physical alterations to the transmission and reception device.

In phase three the protocol begins to look like other QKD schemes, essentially, so the finer details will be omitted. This is the distillation phase in which Alice and Bob take the raw keys from phase one and the noise rate estimate of phase two and put them together to make the final key, which they do in two steps. The first is a classical error-correction step in which Alice and Bob bring their keys into complete agreement. Alice imagines that Bob's raw key B is simply her key A, plus an error string δ, such that B=A+δ. From the noise rate estimate Alice may determine the number of non-zero entries of δ and choose a classical error-correcting code C whose codewords c may correct for this number of errors. She then chooses a codeword randomly and sends Bob the string A+c. He simply subtracts this from his string to obtain c+δ, at which point he may use the error-correcting property to obtain the string c. Now, he and Alice are in possession of the same string with very high probability. This isn't the only method of performing the error-correction step, but all will have essentially the features found here. Namely, Alice and Bob end up with the same string with high probability. Inevitably, there may be classical communication which adds to Eve's information about the final key.

The final step to neutralize Eve's knowledge and obtain a truly secret key is called privacy amplification, and may be implemented by performing one of a class of universal hash functions. At the end of the error-correction step Alice and Bob are left with length-s binary strings, for example. For instance, in the example above, the codeword c could be one of |C| strings, so Alice and Bob may number them all and take the binary representation of the number corresponding to c as the almost-final key k. It will have length roughly $\log_2|C|$, as that's the number of bits required to number all the codewords. Now the hash functions compress these s bits into r, where r is determined from Eve's information about the key, in particular by the Renyi entropy of her distribution of keys. If Eve knows k of the s bits of the key, Alice and Bob may choose a security parameter t such that for $r=s-k-t$ Eve's information about the output of the hash function will be less than $2^{-t}/1$ n 2, provided the choice of the particular hash function within the class is made randomly. One particular choice of hash function is a random binary s×r matrix M. Alice may create this, sends it to Bob, and both compute the final, secret, key Mk.

In an embodiment, the repudiation protocol may be essentially realized in the same manner as the confirmation protocol, except for some changes in phase two to account for the different type of measurement Bob performs. After Bob has performed the repudiation measurement in phase one, he still requires some additional information in order to determine the key letter. Supposing he has eliminated b possible signals, he waits for Alice to send him an additional set of m signals, which she didn't send, where $n-b-1 < m \leq n-2$. The lower bound is the bare minimum required for the protocol to be successfully executed, but then there's only one chance in $\binom{n-1}{n-b-1}$ of Alice sending the necessary message. If Bob receives this message, he now knows which signal was sent, and again labels it by omitting the letters contained in Alice's message and retaining the original order of letters.

Alice may improve the odds by telling Bob more signals that she didn't send. Revealing m unsent signals makes the chance $m!b!/(n-m)!(m+b+1-n)!$. However, in so doing, Alice makes Eve's own task of determining the signal that much easier. Again the protocol is adaptable, for Alice may choose the appropriate value of m given the noise rate they witness. If the noise rate is very low, Alice may safely send bigger messages, since Eve's chances of determining the state properly are very low anyway. Conversely, at high noise rates, Alice must take care not to reveal too much to Eve, lest it be enough to ruin the entire protocol. And once again Alice and Bob may estimate the noise rate of the channel from the rate at which the protocol fails. If the channel (or Eve's interaction) scrambles the signal such that Bob's outcome repudiates the signal Alice did send, the protocol has a slightly greater chance of being successful, because there are now more messages from Alice which Bob will consider useful. In an embodiment, Alice may not ever repudiate the actual signal she sent.

The following provides further discussion regarding features of embodiments having quantum key distribution using equiangular spherical codes. Mutually unbiased bases have been extensively studied in the literature and are simple and effective in quantum key distribution protocols, but they are not optimal. Here, equiangular spherical codes are provided as a more efficient and robust resource for key distribution. Such codes are sets of states that are as evenly spaced throughout the vector space as possible. In the case in which two parties use qubits and face the intercept/resend eavesdropping strategy, they can make use of three equally-spaced states, called a trine, to outperform the original four-state BB84 protocol of Bennett and Brassard (BB84) in both speed and reliability. This points toward the optimality of spherical codes in arbitrary dimensions.

The possibility of secure key distribution using quantum state is by now a well established feature of quantum information theory. In the original 1984 proposal of Bennett and Brassard, four states of a spin-½ system, the eigenstates of $\sigma_z$ and of $\sigma_x$, are used as signals by the sender Alice. These states are naturally partitioned into two orthonormal bases from which the receiver Bob chooses one at random to measure the signal. Because the bases are unbiased, i.e., the overlap between vectors from distinct bases is always the same, equal to ½ for qubits, Bob learns nothing when his measurement doesn't correspond to Alice's preparation, but everything when it does. The nonorthogonality of the states allows Alice and Bob to detect eavesdropping by an adverse Eve, so the states form an unconditionally secure cryptographic protocol.

One more unbiased basis, the eigenvectors of $\sigma_y$, can be added to the BB84 set, forming a new six-state protocol. Unbiased bases can be found in higher dimensions as well, and the key distribution protocol has been extended to such cases, with increasing dimension leading to improved security. In these analyses, however, the security is not proved to be unconditional, since only particular eavesdropping attacks are studied.

Unbiased bases have been the cornerstone of key distribution schemes. But are they optimal? For simple eavesdropping strategies, as show here in the qubit case, they are not, suggesting that they are not optimal for unconditional eavesdropping attacks either. The analysis here is based on a more efficient and robust set of states, the equiangular spherical codes, also known as Grassmann frames. Analysis of the qubit case reveals a key distribution protocol based on three states having equal overlap, the trine ensemble, which is both faster and more secure than the BB84 protocol when subjected to two simple eavesdropping attacks, intercept-resend and cloning. This provides compelling evidence that spherical codes can outperform their unbiased cousins.

Consider a setting of quantum key distribution in which two parties, Alice and Bob, wish to make use of an authenticated public classical channel and an insecure quantum channel controlled by an adversary Eve to establish a secret key for the purposes of encrypting and sharing other data. They start with a sequence of samples from a given tripartite probability distribution shared between the three parties. Alice and Bob then proceed to "distill" the key by sharing information based on their individual sequences over the classical channel. How exactly this distillation is achieved is an information-theoretic problem. However, for eavesdropping strategies in which Eve doesn't directly make use of the distillation information, how the probability distribution arises in practice and what distributions are at all possible are purely questions of physics, discussed herein.

The probability distribution arises from using the quantum channel to send quantum information. Alice sends quantum states drawn from a certain signal ensemble through the channel to Bob, who performs a specific measurement. In the case of signaling states drawn from mutually unbiased bases, the several measurement bases Bob chooses from for his measurement are here amalgamated into a single POVM (positive operator-valued measure) measurement. Alice and Bob fix the signal ensemble and the measurement using the public channel. Eve is free to exploit this information to mount an attack on their protocol, using her control of the quantum channel. She can in principle subject the signal states to any physical interaction that she wishes. Alice and Bob's goal is to exploit the quantum nature of the channel to make Eve's eavesdropping ineffective.

The relevant probability distribution is the joint probability $p(a_i, b_j, e_k)$ of Alice's signal, Bob's measurement result, and the rest of any measurement Eve performs in the course of eavesdropping. Repeated use of the protocol yields a sequence of samples drawn from this distribution. Alice and Bob, however, must establish which distribution they are sampling from, as it depends on Eve's attack. Typically, Eve has some physical setup which can give rise to many different distributions as she changes the strength of her interference with the channel. Given an assumption of the type of attack, Alice and Bob determine the extent of Eve's interference by making public and comparing a fraction of the Alice's signals and Bob's measurement results. Knowing the distribution p, they can distill a key of length MR from the remaining M samples in accordance with the bounds $$I_E \leq R \leq I(A:B\backslash E), \quad (6)$$

where $I(X:Y)=H(X)+H(Y)-H(XY)$ is the mutual information of X and Y, $H(\cdot)$ being the Shannon entropy, and $I_E=I(A:B)-\min\{I(A:E), I(B:E)\}$. The lower bound obtains when the key is distilled using one-way communication; to progress beyond this requires a technique called advantage distillation, though this is of limited efficiency.

These bounds provide a method of investigating the cryptographic usefulness of a signal ensemble. Given a signal ensemble, Bob's measurement, and an assumption about the nature of Eve's attack, the probability distribution can be calculated, and the key rate bounds determined. In this way the security of the protocol against this attack is established. To say that a protocol is unconditionally secure is to demonstrate its security against all possible attacks.

The focus now turns to Alice's signal ensemble and Bob's measurement. An intuitively appealing ensemble is a spherical code, a complex-vector-space version of points on a sphere whose minimal pairwise distance is maximal. The complex version, called the Grassmann packing problem, asks for a set of unit vectors in $C^d$ whose maximal pairwise overlap is minimal. When all these pairwise overlaps are equal, this equiangular spherical code is called a Grassmann frame; i.e., a set $$C = \{|\phi_k\rangle\} \in C^d\}_{k=1}^n$$

for $n \geq d$ is a Grassmann frame if $$|\langle\phi_j|\phi_k\rangle|^2 = \frac{n-d}{d(n-1)} \quad \forall\, j \neq k. \quad (7)$$

Grassmann frames also arise as the solution to the "minimum energy problem." For a set of unit vectors C, call $$V_t(C) = \sum_{j,k} |\langle\phi_j|\phi_k\rangle|^{2t}$$

the t-th "potential energy" of the set of the vectors. The minimum energy problem is to find C having $n \geq d$ elements such that $V_1 = n^2/d$ and $V_2$ is minimized. Note that $n^2/d$ is the global minimum of $V_1$. This follows from considering the (at most) d nonzero (real) eigenvalues $\gamma_j$ of the Gram matrix $G_{jk} = \langle\phi_j|\phi_k\rangle$. Clearly $$\sum_k \gamma_k = n$$

and $$\sum_k \gamma_k^2 = V_1(C).$$

These being the equations for a plane and a sphere, the minimum of $V_1$ occurs if and only if all the $\gamma_k$ are equal to n/d, whence $V_1$ is bounded below by $n^2/d$. Thus what is sought is the set of vectors with the minimum $V_2$ energy, given minimum $V_1$ energy.

To find a lower bound for the minimum of $V_2$, let $\lambda_{jk} = |\langle\phi_j|\phi_k\rangle|^2$, and employ the same method again. This provides immediately that $$\sum_{j\neq k} \lambda_{jk} = V_1 - n = n(n-d)/d$$

and $$\sum_{j\neq k} \lambda_{jk}^2 = V_2 - n,$$

whence the minimum of $V_2$ over all sets minimizing $V_1$ is bounded below by making all the $\lambda_{jk}$ the same and given by Eq. (7). When this lower bound is achieved, i.e $V_2 = n^2(n-2d+d^2)/(n-1)$, the result is a Grassman frame.

The existence of Grassmann frames isn't known for arbitrary n and d, though some general statements can be made. They always exist for $n=d+1$ (a regular simplex), but never when $n>d^2$. For $n \leq d^2$, when a Grassman frame exists, it is a spherical code, but for $n>d^2$, spherical codes aren't equiangular.

By minimizing $V_1$, Grassmann frames automatically form measurement POVMs, which can be used by Bob to detect Alice's signal. This is true because $$S = \sum_k |\phi_k\rangle\langle\phi_k| = (n/d)I,$$

so that a POVM can be constructed from the subnormalized projectors $(d/n)|\phi_k\rangle\langle\phi_k|$. To see this, fix an orthonormal basis $\{|e_k\rangle\}$ and consider the matrix $T_{jk}=\langle e_j|\phi_k\rangle$. The Gram matrix can be written as $G_{jk}=(T^+T)_{jk}$, while $S_{jk}=(TT^+)_{jk}$, so both have the same eigenvalues. When $V_1$ is minimized, these d eigenvalues are all n/d, implying that the vectors form a resolution of the identity.

Such sets are appealing because they are the sets that are "least classical" in the following sense. Consider using these quantum states as signals on a classical channel as follows. Instead of sending the quantum state, Alice performs the associated measurement and communicates the result to Bob using a classical channel. Bob then prepares the associated quantum state at his end. The fidelity of Bob's reconstruction with the input state, averaged over inputs and measurement results, measures how well the classical channel can be used to transmit quantum information. This fidelity is $dV_2/n^2$, so among all ensembles which themselves form POVMs, Grassmann frames are hardest to transmit "cheaply" in this way. Eavesdropping on the communication between Alice and Bob makes the channel more classical-Eve is essentially trying to copy the signal-so one might expect that Grassmann frames are useful in foiling the eavesdropper.

For the case of qubits, there are only two equiangular spherical codes, the trine and the tetrahedron. These are named after their Bloch-sphere representation: the trine is a set of three equally-spaced coplanar vectors, and the tetrahedron is the familiar regular simplex in three dimensions. Here the following representation of the trine states may be used:

$$|\phi_j\rangle = \frac{e^{2\pi i j/3}}{\sqrt{2}}(|0\rangle + e^{2\pi i j/3}|1\rangle), \quad j=0,1,2. \tag{8}$$

The task now is to determine key rate bounds for the trine protocol and to compare with the original BB84 scheme. Generically, Bob uses the same Grassmann frame to measure as Alice uses to signal. Such a measurement attempts to confirm which state Alice sent. For qubits, however, Bob can construct an "inverted measurement" from the states $|\tilde{\phi}_j\rangle$ that are orthogonal to the trine states; this measurement attempts to exclude one of the possible signal states. By so doing, he increases the mutual information of his outcomes with Alice's signals, thus improving the prospects for creating a key. This strategy doesn't work in higher dimensions, as the orthogonal complement of a signal state isn't a pure state.

Two eavesdropping attacks are considered here, the cloning attack and the intercept-resend attack. Both are single-system, incoherent attacks, as opposed to the most general many-system, coherent attacks. One feature of generic attacks is Eve's ability to control the interaction strength of her probe with the signal. To mimic this feature in these schemes, Eve intercepts only a fraction q of the signals, allowing the rest to pass unmolested.

Now consider the two attacks in turn. The cloning attack is simple: Eve attempts to clone the incoming signal state as best she can and then makes the same measurement as Bob on her probe. She implements the unitary operator U acting on the signal and her probe state, initially in the state $|0\rangle$, which maximizes the average fidelity $$\sum_j |\langle\phi_j,\phi_j|U|\phi_j,0\rangle|^2/n,$$

subject to the constraint that all states are cloned equally well. If Eve's attack is not symmetric in this sense, Alice and Bob might be able to improve their detection by exploiting the asymmetry. The resulting distribution for a clone attack is $$p(a_i,b_j,e_k) = \frac{4}{27}|\langle\tilde{\phi}_j,\tilde{\phi}_k|U|\phi_i,0\rangle|^2. \tag{9}$$

To describe varying q, Eve's random variable includes an additional value which occurs when she does not implement U, in which case the expression for the distribution is the same, but with I replacing U. A numerical maximization of U for the trine and the four states of the BB84 protocol may be carried out using Mathematica's implementation of the simulated annealing algorithm. The trine result is $$U = \frac{1}{\sqrt{2}}\begin{pmatrix} 0 & 0 & 0 & \sqrt{2} \\ 1 & 1 & 0 & 0 \\ 1 & -1 & 0 & 0 \\ 0 & 0 & \sqrt{2} & 0 \end{pmatrix}, \tag{10}$$

for a fidelity of $(1+\sqrt{2})/4$. For BB84, the $\pm 1$ $\sigma_z$ eigenstates are cloned to $$\frac{1}{4}((2\pm\sqrt{2})|00\rangle \mp i\sqrt{2}(|01\rangle+|10\rangle) + (2\mp\sqrt{2})|11\rangle), \tag{11}$$

and the other two cloned states are obtained by the positive and negative superpositions of these states. Somewhat surprisingly, the cloning fidelity for BB84 is the same as for the trine. More surprisingly, cloning is useless to Eve in both cases, since the lower key rate bound is positive for all values of q. Cloning every signal provides Eve as much information as Bob about Alice's string, as the cloning procedure turns out two copies of equal quality. However, Alice's information about Bob's string is still greater than Eve's, so they may use that string as the starting point for key distillation. By computing the bounds from equation 6 it is easily verified that the trine ensemble offers higher key generation rates, but as cloning is a very weak attack, this conclusion is of little force.

The focus now shifts to the intercept-resend attack. This is similar to splicing a classical channel into a quantum channel, as described above. Eve receives Alice's signal, measures it, creates a new quantum state based on that measurement, and sends it on to Bob. Due to the symmetry of inversion between Alice and Bob's states it's best for Eve to include in her measurement both ensembles. This ensures that her mutual information with Alice is the same as with Bob. Upon observing a particular result, she simply leaves the system in the corresponding state; thus the joint distribution when q=1 is:

$$p(a_i, b_j, e_k) = \frac{2}{27} \begin{cases} |\langle\phi_i|\tilde{\phi}_k\rangle|^2 & |\langle\tilde{\phi}_k|\tilde{\phi}_j\rangle|^2 & 0 \le k \le 2 \\ |\langle\phi_i|\phi_k\rangle|^2 & |\langle\phi_k|\phi_j\rangle|^2 & k \le 3 \le 5 \end{cases} \quad (12)$$

Again, for varying q, the probability distribution includes an extra value that occurs when Eve doesn't intercept the signal. From this distribution it is easy to calculate the key rate bounds and the rate E of additional errors, due to Eve's attack, which Alice and Bob observe when comparing samples using the public channel. Considering the key rate R as a function of the error rate E enables a comparison with the same quantities derived from the BB84 protocol. FIG. 1 shows the upper and lower key generation rate bounds for the trine and BB84 protocols as a function of error rate subject to the intercept-resend attack. For each protocol, the bounds emanate from the same point on the vertical axis at zero error (no eavesdropping) and drop down to zero key rate at the largest error rate on the horizontal axis. The trine is both faster (higher key generation rate) and more robust (higher tolerable error) than the BB84 protocol. By having one fewer outcome, the trine is inherently better at information transfer between the parties. The lower bound, which is more relevant for realistic implementation, shows that the trine is also much more secure, tolerating roughly 9% error.

Note that in this analysis, the usual first step in the BB84 protocol, i.e., sifting over the public channel to determine when Bob's measurement basis matches Alice's signal basis, cannot be performed for the trine, as there is nothing like different bases. Strictly speaking, sifting belongs to the key distillation phase of the protocol, so it is appropriate to exclude it here.

This analysis strongly suggests that the trine-based protocol might be much more useful for key distribution than BB84, but this conclusion is not firm, as the two attacks considered are insufficiently general. It is known, however, for the BB84 protocol that the intercept-resend attack is nearly optimal, so it is quite reasonable to expect the analysis here to be indicative of the more general case.

Recently a strong relationship between secure key distribution and entanglement has been identified by considering a coherent version of these "prepare-and-measure" protocols. Instead of preparing a state and sending it to Bob for measurement, Alice prepares a bipartite state, ostensibly entangled, and sends half to Bob. Each party then measures his or her half, returning the protocol to the original picture. In this setting both the upper and lower key generation rate bounds can be translated into questions of entanglement and nonlocality. From the upper bound, it follows that secure key distribution is possible if the corresponding coherent process leaves Alice and Bob with a state which is one-copy distillable. From the lower bound, it follows that key distribution is possible if the bipartite state violates some Bell inequality.

Equiangular spherical codes fit nicely into this picture, as they can always be realized from maximally entangled states. Thus they start on the same footing as unbiased bases, for which this is also true. To demonstrate this, consider a spherical code C={$|\phi_k\rangle$} and a "conjugate" code C*={$|\phi_k^*\rangle$} formed by complex conjugating each code state in the standard basis. Then it is a simple matter to show that $$|\Phi\rangle = (\sqrt{d/n}) \sum_k |\phi_k\rangle|\phi_k^*\rangle$$

is maximally entangled. Thus if Alice prepares this state and sends the second half to Bob, they can realize the "prepare-and-measure" scheme by measurement.

The performance of the trine-based protocol establishes the usefulness and suggests the superiority of Grassmann frames for key distribution. Extending the intercept-resend analysis to higher dimensions may be straight-forward, but tedious. The result is the same: in every dimension, a suitable Grassmann frame can be found to outperform the unbiased bases in both speed and reliability.

Physics dictates the distributions that can be realized, and information theory determines how to distill a key from the data drawn from the distribution. It is important to remember that distillation is relatively straightforward when using unbiased bases. After making many measurements, Alice and Bob sift the data to determine in which cases they have selected the same basis. Absent any eavesdropper, this creates a key, and if errors are present they can employ a straight-forward privacy amplification scheme to ensure security. First, they determine the error rate of Bob's data, and knowing this, they create a secret key that Eve has vanishingly small probability of knowing simply by taking the EXCLUSIVE-OR of large blocks of the data. When using equiangular spherical codes, no such simple key distillation protocol is available.

The following provides further discussion regarding features of embodiments having spherical code key distribution protocols for qubits. Spherical codes may be potentially more capable ensembles for quantum key distribution. The following discussion concerns specific key creation protocols for the two qubit-based spherical codes and the trine and tetrahedron with analysis of them in the context of the intercept/resend attack. When compared to the standard unbiased basis protocols, BB84 and six-state, two distinct advantages are found. First, they offer faster key rates and improved security, the trine besting its counterpart BB84 and the tetrahedron the six-state protocol. Second, the key error rate may be computed from the success rate of the protocol itself, removing the need to sacrifice key bits for this purpose. This simplifies the protocol and improves the key rate still further.

Heretofore quantum key distribution protocols have often been constructed using sets of unbiased bases, enabling key bit creation whenever the two parties Alice and Bob happen to send and measure the quantum system in the same basis. Alice randomly selects a basis and a state within that basis to send to Bob, who randomly chooses a basis in which to measure and decodes the bit according to their pre-established scheme. Should Bob choose the same basis as Alice, his outcome is perfectly correlated to hers. Each of the parties publicly announces the bases used, and for each instance they agree, they establish one letter of the key. The use of many distinct bases prevents any would-be eavesdropper Eve from simply reading the encoded bit without Alice and Bob noticing. In two dimensions two sets of mutually unbiased bases exist, forming the BB84 and six-state protocols.

Equiangular spherical codes may be used to construct a new scheme for key distribution. Two such codes exist in two dimensions. In the Bloch-sphere representation these ensembles may be pictured as three equally-spaced coplanar states forming a trine or four equally-spaced states forming a tetrahedron. Both Alice and Bob replace their use of unbiased bases with equiangular spherical codes by arranging Bob's code to be the dual of Alice's, where key creation becomes a process of elimination. In this setup, each of Bob's measurement outcomes is orthogonal to one of Alice's signals. Thus each outcome excludes the corresponding one of Alice's possible signal. Conversely, given the transmittal signal, Alice may already eliminate one outcome Bob might receive. Starting from this little bit of knowledge about what the other doesn't have, they may proceed by publicly announcing further results not obtained or signals not sent and eventually exclude enough possibilities to agree on a bit. The shared (anti-)correlation between signal and outcome allows them to remain one step ahead of an eavesdropper Eve, ensuring that unless she tampers with the quantum signal, she knows nothing of the created key.

As with protocols using unbiased bases, should Eve tamper with the signal, the disturbance can be recognized by Alice and Bob in the statistics of their results. With this they can determine what she knows about their key, and they may either proceed to shorten their key string so as to remove Eve's information of it, or else discard it entirely and begin anew. The overarching questions in evaluating a key distribution protocol are whether or not it is unconditionally secure, and if so, what the maximum tolerable error rate is. If, by granting Eve the ability to do anything consistent with the laws of physics, Alice and Bob can still share a key, the protocol is said to be unconditionally secure. This state of affairs persists up to the maximum tolerable error rate, at which point Alice and Bob must abandon their key creation efforts. Because establishing unconditional security is complicated and delicate, it is ill-advised to begin such an investigation immediately, without some indication that it is warranted. Here, the intercept/resend attack is examined, both in harsh and gentle form, and indeed find such an indication. First, however, consider the protocols for the two spherical codes in detail.

Unlike the case of unbiased bases in which Alice's choice of signal or Bob's outcome determines the key letter, for the trine and tetrahedron it is only the relation between Alice's signal and Bob's outcome that determines the bit. In the trine protocol Alice's choice of signal narrows Bob's possible outcomes to the two lying 60 degrees on either side. Each is equally likely, and they publicly agree beforehand that the one clockwise from Alice's signal corresponds to '1' and the other '0'. Alice hopes to determine which is the case when Bob announces one outcome that he didn't receive. For any given outcome, he chooses randomly between the other two and publicly announces it. Half the time he announces that he didn't receive the outcome which Alice already knew to be impossible. This tells Alice nothing new, and she announces that the protocol failed. In the other half of cases, Alice learns Bob's outcome and announces success.

Upon hearing his message was a success, Bob can determine the signal Alice sent. For any outcome Bob receives, he immediately knows one signal Alice couldn't have sent, and the message that his announcement was successful indicates to him that she also didn't send the signal orthogonal to his message. Had she set that signal, she would have announced failure; thus Bob learns the identity of Alice's signal. Each knowing the relative position of signal and outcome, they can each generate the same requisite bit.

Figure 2:
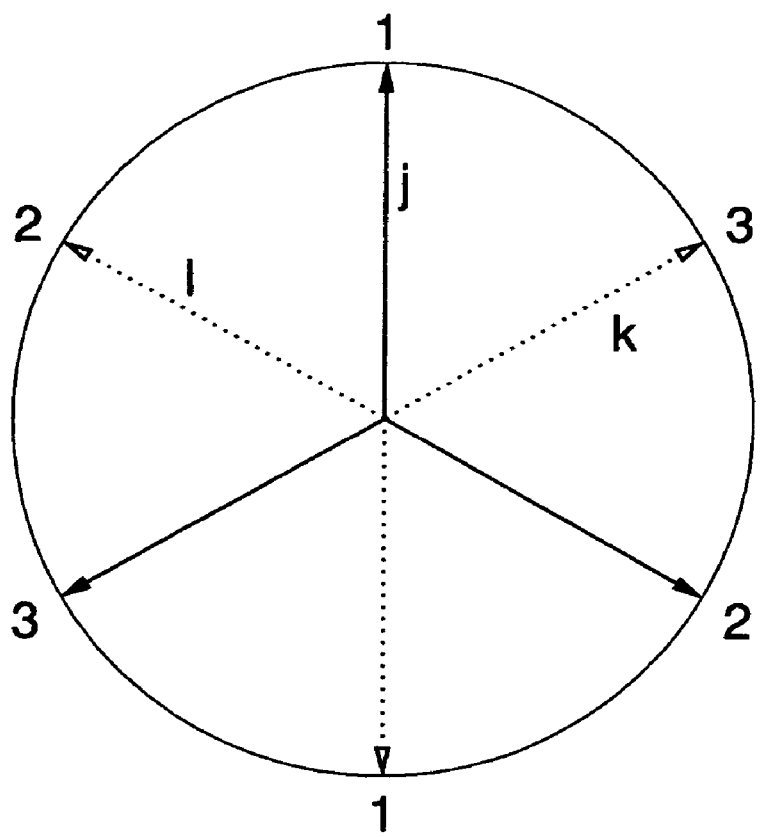
FIG. 2 depicts a Bloch-sphere representation of the trine-based protocol by which Alice and Bob create a secret key bit, shown here creating a '1'.

Mathematically, the protocol may be considered as follows. Alice sends signal j, and Bob necessarily obtains k=j+1 or k=j+2. He announces that he didn't receive l≠k. If l=j, Alice announces failure. Otherwise each party knows the identity of j, k, and l, and they compute the key bit as $(1-\epsilon_{jkl})/2$. FIG. 2 shows the case that they agree on a "1".

FIG. 2 depicts a Bloch-sphere representation of the trine-based protocol by which Alice and Bob create a secret key bit, shown here creating a '1'. Alice's three possible signal states are shown in black and Bob's measurement outcomes in dotted lines; antipodal points are orthogonal. Without loss of generality it may be assumed that Alice sends the state j=1. The antipodal point is the impossible outcome for Bob; here he obtains the outcome k=3. Of the two outcomes he did not get, he picks one at random and announces this to Alice. Here he announces the outcome l=2, and Alice infers the value of k. Had Bob announced the other outcome, the protocol would fail, as this doesn't tell Alice anything she doesn't already know. Here she announces that she is satisfied with Bob's message, and Bob infers the value of j, since Alice's signal could not have been l. Now they compute the bit $(1-\epsilon_{jkl})/2=1$. The announcement only reveals l, so the bit is completely secret.

Though Eve may listen to the messages on the classical channel, she won't have any knowledge of the bit value, for all she knows is one outcome Bob didn't receive and the corresponding antipodal state that Alice didn't send. Of the two remaining equally-likely alternatives, one corresponds to a '0' and the other a '1'. Hence the protocol establishes one fully secret bit half the time, analogous to the BB84 protocol.

Figure 3:
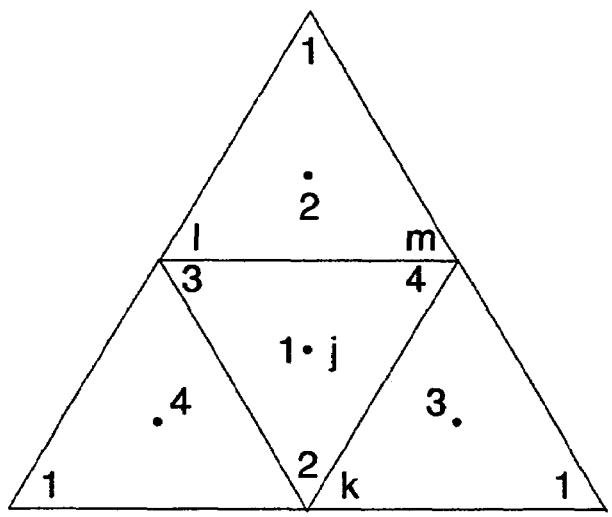
FIG. 3 depicts an unfolded view of the Bloch-sphere tetrahedron states.

The strategy for the tetrahedron is entirely similar, except that Bob must now reveal two outcomes he didn't receive. As depicted in FIG. 3, Alice uses four tetrahedral states in the Bloch-sphere picture, and as before Bob uses the dual of Alice's tetrahedron for measurement. Alice sends signal j and Bob receives k≠j. He then randomly chooses two outcomes l and m he didn't receive and announces them. One-third of the time this is successful, in that l≠j and m≠j. This allows Alice to infer k, and her message of satisfaction allows Bob to infer j, just as for the trine. They then each compute the bit $(1+\epsilon_{jklm})/2$.

FIG. 3 depicts an unfolded view of the Bloch-sphere tetrahedron states. Vertices of triangles correspond to Bob's outcomes, their centers Alice's signals; all three vertices of the large triangle represent the same point antipodal to its center. Suppose Alice sends signal j; Bob necessarily receives k≠j. Here suppose j=1 and k=2. Bob then announces two outcomes he didn't obtain, here shown as l=3 and m=4. Had either message equaled j, which happens ⅔ of the time, Alice announces failure. Otherwise, as here, she accepts. Thus Alice determines k, and Bob finds out j. They compute the bit $(1+\epsilon_{jklm})/2=1$. The announcement reveals only l and m, so the bit is secret.

Again they stay one step ahead of Eve as she listens to the messages, as she can only narrow Alice's signal down to two possibilities. Given the order of Bob's messages, one of these corresponds to '0' and the other to '1', so Eve is ignorant of the bit's identity. Using the tetrahedron allows Alice and Bob to establish one fully secret bit one third of the time, analogous to the six-state protocol.

In the two protocols, the dual arrangement of signals and measurements allows Alice and Bob to proceed by elimination to establish a putative key. To ensure security of the protocols, however, the arrangement must also disallow Eve from reading the signal without Alice and Bob noticing. Analyzing the intercept/resend attack provides evidence of how well the protocols based on spherical codes measure up to this task.

If Eve tampers with the signals in order to learn their identity, the inevitable disturbance allows Alice and Bob to infer how much Eve knows about the raw key. They can then proceed to use error correction and privacy amplification procedures to distill a shorter key which, with high probability, is identical for Alice and Bob and which Eve has low probability of knowing anything about. Instead of delving into the details of error correction and privacy amplification, a lower bound on the optimal rate of the distilled key, i.e., its length as a fraction of the raw key, may be used instead. This provides a reasonable guess as to what may be achieved in practice and is known to be achievable using one-way communication. Given $N \to \infty$ samples from a tripartite distribution p(a, b, e), with high probability Alice and Bob can distill a length RN string about which Eve has asymptotically zero information for $$R \geq I(A:B) - \min\{I(A:E), I(B:E)\}. \tag{13}$$

The tripartite distribution in this case refers to Alice's and Bob's bit values a and b, along with Eve's best guess e from the eavesdropping.

Here, it is assumed that Eve simply intercepts a fraction q of the signals, measures them, and sends a new state on to Bob. The first task is then to determine R as a function of q and then to relate q to the statistics compiled in the course of the protocol. Eve's best attack is to use both Alice's and Bob's trines for measurement, half the time pretending to be Alice and the other half Bob. This holds for the tetrahedron as well and is due to the minimum in Eq. (13). By pretending to be Alice, Eve can guess Bob's result fairly well, but Alice's less so: I(B:E) is large but I(A:E) small. By pretending to be Bob, the situation is reversed, with the mutual information quantities changing roles. By mixing the two strategies, Eve increases the minimum knowledge she has about either party's bit string. The scheme in which Eve pretends to be Bob is noted to be the measurement maximizing her mutual information with Alice; however, as the analysis stops there and doesn't proceed to consider the rate bounds, it's insufficient as a cryptographic analysis.

To determine the mutual information quantities as functions of q, it suffices to consider first the case in which Eve intercepts every signal and uses Alice's ensemble for measurement. With these quantities in hand, Eve's strategies may be mixed appropriately and then include her probability of interception. Begin with the trine. Given a signal state from Alice, there are two cases to consider. Either Eve measures and gets the same state, which happens with probability ⅔, or she obtains one of the other two results, with probability ⅙ for each. Whatever her outcome, she passes the corresponding state along to Bob and guesses that it was the state sent by Alice, unless the subsequent exchange of classical messages eliminates this possibility, at which point she reserves judgment.

Suppose her outcome corresponds to Alice's signal, and thus no disturbance is caused. Naturally, Alice and Bob go on to establish a bit half the time, a bit whose value Eve now knows. On the other hand, should her outcome not coincide with Alice's signal, there are two further possibilities. Half the time Bob obtains a result consistent with Alice's signal, and a further half the time the protocol succeeds. However, for this round to succeed, the required messages will eliminate Eve's outcome as Alice's signal, thus forcing Eve to abandon her guess. By eavesdropping, she has inadvertently created a situation in which Alice and Bob establish a key bit, but excluded herself from knowing it. In the other case, Bob's result is orthogonal to Alice's signal, and from here the pair are guaranteed to think the procedure was a success, but also guaranteed to compute different bit values. Eve's guess at the bit value corresponds to Bob's in this case.

Putting all this together, one obtains that the protocol succeeds with probability 7/12. Of the key bits created, Bob agrees with Alice with probability 5/7, while Eve agrees with probability 9/14, only guessing with probability 5/7. Eve and Bob agree on their bit values with probability 5/7. These numbers are obtained by considering the raw probabilities of agreement and renormalizing by 12/7. Should Eve instead measure the signals using Bob's trine ensemble, her agreement probabilities with Alice and Bob are swapped. Mixing the two eavesdropping strategies yields her an agreement probability of 9/14 an error probability of 1/14 and a no-guess probability 2/7. To interpolate between the endpoints of no interception and full interception, note that to condition on the cases of successful bit creation, the probability of bit agreement must be renormalized by the probability of success. This probability depends linearly on q: $p_{success} = (6+q)/12$. All probabilities must therefore contain 6+q in the denominator, whence the form of the probabilities may be derived that Bob's and Eve's bit values correspond to Alice's:

$$p_{ab} = \frac{6-q}{6+q} \quad p_{ae} = \frac{9q}{2(6+q)}. \tag{14}$$

Eve probability to not guess at all is $2(3-2q)/(6+q)$.

By determining the probability of error in Alice's and Bob's bit strings as a function of q, comparison to other protocols may be made. For the trine, errors occur in the key string with probability $2q/(6+q)$. Using the expressions in Eq. (14) in the rate bound, one obtains that R=0 corresponds to a maximum tolerable error rate of 20.4%. This compares favorably with the BB84 protocol's maximum tolerable error of 17.1%.

Analysis of the tetrahedron protocol proceeds similarly by examining the various cases. In this case, when q=1 the failure rate of the protocol drops to ⅝, while Alice and Bob agree with probability ⅝, Eve has probability 7/16 of knowing Alice's or Bob's bit value, and she reserves judgment half the time. As the success rate of the protocol goes like $(3+q)/9$, the form of the probabilities using the same method may be determined to be $$p_{ab} = \frac{6-q}{2(3+q)} \quad p_{ae} = \frac{7q}{4(3+q)}, \tag{15}$$

while the error rate in the key string is $3q/2(3+q)$ and Eve's probability of not guessing is $(3-q)/(3+q)$. Again using these probabilities in the rate bound yields a maximum error rate of 26.7%. Like before, this compares favorably to the maximum tolerable error rate in the six-state protocol of 22.7%.

Eve's attack could gentler, however. In the version of the attack already considered, the measurement POVM consists of subnormalized projectors onto the code states in addition to an element proportional to the identity operator, corresponding to the case in which Eve doesn't intercept the signal. When this final, uninformative outcome obtains, Eve may simply guess the value of the signal. She shouldn't guess when an informative measurement is excluded, as described above, because in so doing she is ignoring that piece of information, to her detriment. But for the uninformative outcome the identity operator could equally well be divided up and the pieces distributed among the other elements of the POVM, forming a new set whose elements are each a linear combination of the identity and the same projectors. The difference is that the dynamics associated with this POVM can be different than the original. Using the square root of each measurement operator for the dynamics, the resulting measurement yields Eve more information for the same amount of disturbance. In the context of the BB84 protocol, this attack was determined to be optimal when Eve doesn't wait to hear in which basis the signal was prepared.

In order to analyze this attack, it's simpler to have the computer do the bookkeeping, and to this end Mathematica may be enlisted. Since this represents a stronger attack, the maximum tolerable error decreases: the trine tolerates 16.6%, as opposed to 15.3% for its cousin BB84. The tetrahedron remains the most robust, tolerating a maximum error rate of 22.6%, as compared to 21.0% for the six-state protocol. In terms of channel error rate these figures double, if the quantum channel is considered to be a depolarizing channel instead of arising from Eve's interactions. A little thought reveals that if Bob receives the maximally-mixed state instead of Alice's signal, the probability of error given that the protocol proceeds to completion is still only ½.

Framing the key rate in term of the error rate is solely for ease of comparison, as it is not necessary for Alice and Bob to sacrifice key bits in order to obtain an estimate of q when using spherical codes, in contrast to the situation for the unbiased bases. For spherical codes the success rate of the protocol itself determines q; as the channel becomes noisier and Bob's outcome less correlated to Alice's signal, the success rate increases. Of course, not all of this increase provides useful key: most of it leads to errors. But Eve cannot substitute signals solely for the purpose of modifying the success rate, as her signals won't be correlated with Alice's and will therefore also lead to an increase in the success rate. Hence she is precluded from masking her interceptions, and Alice and Bob can determine q from the failure rate itself.

Finally, a word on the feasibility of implementing such a protocol. Generation of trine or tetrahedral codewords as polarization states of (near) single-photon sources is not difficult. The generalized measurements accompanying the ensembles can be performed by essentially using polarizing beam splitters to map polarization states into different modes and proceed with linear optical from there. Such measurements have indeed been performed, with rms errors in observed statistical distributions of 3.8% for the trine and 2.9% for the tetrahedron.

By considering the intercept/resend eavesdropping attack, several insights into the advantages of using spherical codes for key distribution have been established. First and foremost is the strong possibility of enhanced security. Subsequent analyses either of stronger attacks, such as use of an asymmetric cloning machine, or the use of error-correcting codes to beat back noise are required to rigorously demonstrate this fact, though the intercept/resend attacks are indicative of the trend. Beyond enhanced security is the simplification to the protocol of determining the eavesdropper's knowledge from just the failure rate itself, obviating any need to sacrifice raw key bits.

The following provides further discussion regarding features of embodiments for equiangular spherical codes in quantum cryptography. Quantum key distribution protocols based on equiangular spherical codes and their behavior under the intercept/resend attack are discussed. Such protocols offer a greater range of security and speed than protocols based on their cousins, the mutually-unbiased bases, while also enabling the determination of the channel noise rate without the need to sacrifice key bits. For fixed number of signal states in a given dimension, the spherical code protocols offer Alice and Bob more security at the price of slower key generation rates.

In the original 1984 proposal of Bennett and Brassard, four states of a spin-½ system, the eigenstates of $\sigma_z$ and of $\sigma_x$, are used as signals by the sender Alice. These states are naturally partitioned into two orthonormal bases from which the receiver Bob chooses one at random to measure the signal. Because the bases are unbiased, i.e., the overlap between vectors from distinct bases is always the same, equal to ½ for qubits, Bob learns nothing when his measurement doesn't correspond to Alice's preparation, but everything when it does. The nonorthogonality of all the states allows Alice and Bob to detect eavesdropping by an adversary Eve, so the states form an unconditionally secure cryptographic protocol.

One more unbiased basis, the eigenvectors of $\sigma_y$, can be added to the BB84 set, forming a six-state protocol. Unbiased bases can be found in higher dimensions as well, and the key distribution protocol has been extended to such cases, with increasing dimension leading to improved security. In these analyses, however, the security is not proved to be unconditional, since only particular eavesdropping attacks are studied.

Key distribution protocols based on a new ensemble of signals, equiangular spherical codes, may be shown to offer potential advantages over the unbiased bases. The security analysis here is based on the eavesdropper's use of the intercept/resend attack and, as such, doesn't provide firm proofs of security, but rather yields an insight into the workings and features of the protocol. The first feature is simplicity. Such protocols need not sacrifice potential key letters in order to establish the amount of information Eve has learned about the whole key string. The success rate of the protocol itself furnishes this information. Second, equiangular spherical codes offer a greater range of protocol security and key generation speed options for fixed dimension. Finally, for fixed number of signal states in a given dimension, these protocols offer more security but lower key generation rates than do the mutually-unbiased bases.

In a general setting of quantum key distribution, two parties, Alice and Bob, wish to make use of an authenticated public classical channel and an insecure quantum channel controlled by an adversary Eve to establish a secret key for the purposes of encrypting and sharing other data. They start with a sequence of samples from a given tripartite probability distribution shared between the three parties. Alice and Bob then proceed to "distill" the key by communicating information based on their individual sequences over the classical channel. The tripartite probability distribution in question arises from using the quantum channel. Alice sends quantum states drawn from a certain signal ensemble through the channel to Bob, who performs a specific measurement. In the case of signaling states drawn from mutually unbiased bases, the several measurement bases Bob chooses from for his measurement are here amalgamated into a single POVM measurement. Alice and Bob fix the signal ensemble and the measurement using the public channel. Eve is free to exploit this information to mount an attack on their protocol, using her control of the quantum channel. She can in principle subject the signal states to any physical interaction that she wishes. Alice and Bob's goal is to exploit the quantum nature of the channel to make Eve's eavesdropping ineffective.

The relevant probability distribution is the joint probability $p(a_i, b_j, e_k)$ of Alice's signal, Bob's measurement result, and the result of any measurement Eve performs in the course of eavesdropping. Repeated use of the protocol yields a sequence of samples drawn from this distribution. Alice and Bob, however, must establish which distribution they are sampling from, as it depends on Eve's attack. Typically, Eve has some physical setup which can give rise to many different distributions as she changes the strength of her interference with the channel. Given an assumption of the type of attack, Alice and Bob determine the extent of Eve's interference by making public and comparing a fraction of the Alice's signals and Bob's measurement results. In this way they estimate the error rate of the channel, and together with an assumption of the attack, determine the distribution p. From the remaining samples, which are supposed to be an asymptotically large number M, say, they can distill a key of length MR in accordance with the following bounds:

$$I_E \leq R \leq I(A:B\setminus E), \quad (16)$$

where $I(X:Y)=H(X)+H(Y)-H(XY)$ is the mutual information of X and Y, $H(-)$ being the Shannon entropy, and $I_E=I(A:B)-\min\{I(A:E), I(B:E)\}$. The lower bound obtains when the key is distilled using one-way communication. To progress beyond this requires a technique called advantage distillation, though this is of limited efficiency.

These bounds provide a method of investigating the cryptographic usefulness of an ensemble. Given a signal ensemble, Bob's measurement, and an assumption about the nature of Eve's attack, the probability distribution can be calculated, and the key rate bounds determined. In this way the security of the protocol against this attack is established. To say that a protocol is unconditionally secure is to demonstrate its security against all possible attacks.

The focus now turns to Alice's signal ensemble and Bob's measurement. An intuitively appealing ensemble is a spherical code, a complex-vector-space version of points on a sphere whose minimal pairwise distance is maximal. The complex version, called the Grassmann packing problem, asks for a set of unit vectors in $C^d$ whose maximal pairwise overlap is minimal. When all these pairwise overlaps are equal, this equiangular spherical code is called a Grassmann frame; i-e., a set $$C = \{|\phi_k\rangle \in C^d\}_{k=1}^n$$

for $n \geq d$ is a Grassmann frame if $$|\langle \phi_j | \phi_k \rangle|^2 = \frac{n-d}{d(n-1)} \forall j \neq k. \quad (17)$$

Grassmann frames also arise as the solution to the "minimum energy problem." For a set of unit vectors C, $$V_t(C) = \sum_{j,k} |\langle \phi_j | \phi_k \rangle|^{2t}$$

the t-th "potential energy" of the set of the vectors. The minimum energy problem is to find C having $n \geq d$ elements such that $V_1=n^2/d$ and $V_2$ is minimized. Note that $n^2/d$ is the global minimum of $V_1$. This follows from considering the (at most) d nonzero (real) eigenvalues $\gamma_j$ of the Gram matrix $G_{jk}=\langle \phi_j|\phi_k\rangle$. Clearly $$\sum_k \gamma_k = n$$

and $$\sum_k \gamma_k^2 = V_1(C).$$

These being the equations for a plane and a sphere, the minimum of $V_1$ occurs if and only if all the $\gamma_k$ are equal to n/d, whence $V_1$ is bounded below by $n^2/d$. Thus what is sought is the set of vectors with the minimum $V_2$ energy, given minimum $V_1$ energy.

To find a lower bound for the minimum of $V_2$, let $\lambda_{jk}=|\langle\phi_j|\phi_k\rangle|^2$, and employ the same method again. This provides immediately that $$\sum_{j\neq k} \lambda_{jk} = V_1 - n = n(n-d)/d$$

and $$\sum_{j\neq k} \lambda_{jk}^2 = V_2 - n,$$

whence the minimum of $V_2$ over all sets minimizing $V_1$ is bounded below by making all the $\lambda_{jk}$ the same and given by Eq. (17). When this lower bound is achieved, i.e $V_2=n^2(n-2d+d^2)/(n-1)$, the result is a Grasmann frame.

The existence of Grassmann frames isn't known for arbitrary n and d, though some general statements can be made. They always exist for n=d+1 (a regular simplex), but never when $n>d^2$. For $n \leq d^2$, when a Grassmann frame exists, it is a spherical code, but for $n>d^2$, spherical codes aren't equiangular.

By minimizing $V_1$, Grassmann frames automatically form measurement POVMs, which can be used by Bob to detect Alice's signal. This is true because $$S = \sum_\kappa |\phi_\kappa\rangle\langle\phi_\kappa| = (n/d)I,$$

so that a POVM can be constructed from the subnormalized projectors $(d/n)|\phi_\kappa\rangle\langle\phi_\kappa|$. To see this, fix an orthonormal basis $\{|e_\kappa\rangle\}$ and consider the matrix $T_{jk}=\langle e_j|\phi_\kappa\rangle$. The Gram matrix can be written as $G_{jk}=(T^\dagger T)_{jk}$, while $S_{jk}=(TT^\dagger)_{jk}$, so both have the same eigenvalues. When $V_1$ is minimized, these d eigenvalues are all n/d, implying that the vectors form a resolution of the identity.

Such sets are appealing because they are the sets that are "least classical" in the following sense. Consider using these quantum states as signals on a classical channel as follows. Instead of sending the quantum state, Alice performs the associated measurement and communicates the result to Bob using a classical channel. Bob then prepares the associated quantum state at his end. The fidelity of Bob's reconstruction with the input state, averaged over inputs and measurement results, measures how well the classical channel can be used to transmit quantum information. This fidelity is $dV_2/n^2$, so among all ensembles which themselves form POVMs, Grassmann frames are hardest to transmit "cheaply" in this way. Eavesdropping on the communication between Alice and Bob makes the channel more classical—Eve is essentially trying to copy the signal—so one might expect that Grassmann frames are useful in foiling the eavesdropper.

Before examining their resistance to eavesdropping, consider how Alice and Bob might concretely use the equiangular spherical codes to accomplish secure key distribution. Though a protocol satisfying the lower bound of equation 16 is guaranteed asymptotically, it may not be feasible in practice. Consider first the case of a noiseless quantum channel, i.e. no eavesdropping. In a length-N string of samples Alice and Bob will agree with probability d/n. When labeling the states 0 to n−1, Bob's string b is simply Alice's string a plus a string δ having a fraction (n−d)/n of non-zero elements. Alice can select a classical error-correcting code C which can correct these errors, choose a codeword c randomly, and send a+c to Bob. He then simply subtracts this from his string to obtain c+δ, from which he uses the error-correcting property to determine the codeword c. From the Shannon noisy-channel coding theorem, there are roughly NI(A:B) codewords, in accordance with the lower bound.

When Eve has no information about the quantum signals, the communicated string a+c tells her nothing about c, since its effectively encrypted by a. Should Eve have some information about a, gleaned from her tampering with the quantum channel, Alice and Bob may proceed as before to establish c, and then use a privacy amplification procedure to shorten this string and remove any information Eve has about it.

As described, this protocol is not particularly robust; Alice and Bob can do better by first announcing some of the signals not received. Upon receipt of each signal, Bob publicly broadcasts m outcomes he did not obtain. If Alice's signal is among these, they throw it away and proceed to the next. For the signals which pass the test Alice and Bob relabel the remaining states in order from 0 to n−m−1 and follow the above procedure. This occurs with probability m/(n−1) as Bob could send any of $$\binom{n-1}{m}$$

outcomes and $$\binom{n-2}{m-1}$$

of these contain Alice's signal. For those which pass the test, Alice and Bob relabel the remaining states in order from 0 to n−m−1 and follow the error-correcting procedure. The protocol itself succeeds with probability $$p_{succeed} = \frac{n(n-1) - m(n-d)}{n(n-1)} = \frac{s}{n(n-1)}, \qquad (18)$$

where the constant s is implicitly defined. Meanwhile, the key rate when using an n-word equiangular spherical code in d dimensions excluding m outcomes is given by $$R = \log[n-m] + \frac{d(n-1)}{s}\log[d(n-1)] + \left(1 - \frac{d(n-1)}{s}\right)\log[n-d] - \log s \qquad (19)$$

The real question is how well the protocol tolerates attempted eavesdropping. To begin formulating an answer it is useful to consider the intercept/resend attack. Because it is straightforward to analyze, it offers immediate insight into the usefulness of these protocols. A full treatment of the problem could involve Alice and Bob using quantum error-correcting codes to turn a noisy quantum channel into a smaller, noiseless channel. However, this is far too complicated for the first step in this analysis.

In the intercept/resend attack it has been assumed that Eve fixes a fraction q of signals to intercept. She measures those so chosen using the same equiangular spherical code as does Bob, resending him the output of this process. Eve simply guesses Alice's signal to be her outcome, unless it is excluded by Bob's announcement. In this case she may still guess, but retains the information that she was forced to do so.

By delineating the various cases, it is uncomplicated to arrive at the relevant quantities. First, the success rate of the protocol depends on q as in the following expression. Letting t=s(n−1)−qm(n−d)(d−1), the success rate is now $$p_{success} = t/n(n-1)^2. \qquad (20)$$

Alice and Bob's joint probability distribution is determined by the agreement probability $$p_{a=b} = (n-1)(d(n-1) - q(n-d)(d-1))/t. \qquad (21)$$

Since Alice and Bob use the same ESC ensemble, Eve's joint probability with Alice is the same as with Bob. In order to account for the cases in which Eve measures the signal but this outcome is later excluded by the protocol, an event to her probability distribution may be appended, denoted by ?. Now she has n−m+1 total outcomes, and the ? outcome functions as a guess as to the key letter in the cases it occurs. The joint probability of such an exclusion and the particular signal j is plainly the same for all j, and together with the probability of agreement between Alice and Eve, these quantities fully describe the overall distribution:

$$p_{a=e} = qd(n-1)s/nt \qquad (22)$$

$$p_? = 1 - qs^2/nt. \qquad (23)$$

These quantities enable one to compute the lower bound on the optimal key rate in equation 16. Then, the value of q may be determined such that R=0, and from this the maximum tolerable error rate for a given n, m, d combination. Finally, this error rate may be converted into the corresponding channel depolarizing rate for the purposes of comparison with the unbiased bases. Considering the error rate alone is misleading as for a noiseless channel Alice and Bob expect no errors when using unbiased bases, but do expect some errors when using the spherical codes. Better protocols are more resistant to channel noise, and the depolarizing channel is picked for simplicity. For the spherical codes the depolarizing rate r is related to the error probability $p_e = 1 - p_{a=b}$ via the expression $$r = \frac{s}{m(d-1)} - \frac{n(n-1)(n-m-1)}{m(d-1)(n-1+m(p_e-1))} \quad (24)$$

For protocols using unbiased bases these expressions are much simpler; in fact it is easier to work with the mutual information expressions themselves. For a given probability of error between Alice and Bob, their shared information is the full amount less the corruption caused by the error:

$$I(A:B) = \log d + p_e \log p_e + (1-p_e)\log(1-p_e)/(d-1) \quad (25)$$

Eve gains information only if she measures in the correct basis, and the basis announcement step prevents her from incorrectly guessing Alice's signal. Thus she gains the full information log d if she manages to measure in the correct basis. Letting k be the number of bases, this makes Eve's information q/k log d. The probability of error is (k−1)(d−1)/kd, so in terms of error probability, Eve's mutual information is $$I(A:E) = \frac{d}{(d-1)(k-1)} p_e \log d \quad (26)$$

The success rate of the protocol is always the probability 1/k for Bob to measure in the same basis Alice prepared the state, regardless of Eve's interference. Finally, the equivalent depolarizing rate r for a given error rate $p_e$ is simply $r=p_e d/(d-1)$.

Now, the various aspects of both protocols may be compared. The first difference comes from the success rate. When using unbiased bases, the protocol will fail with probability (k−1)/k no matter how noisy the channel. To determine the error rate Alice and Bob must announce some of their created key letters so as to compare how often they agree. Obviously these letters cannot be used in the key so they are sacrificed. However, for equiangular spherical codes the success rate depends on the intercept rate. Successful execution of the protocol relies on the correlation between Bob's outcome and Alice's signal, thus the probability of success decreases as the noise increases. Further, Eve can't replace the signals with any others to increase the success rate and attempt to mask her intervention on other signals, for she would need to know Alice's signal. Thus, there is no need to sacrifice key letters in order to estimate Eve's information.

The second immediate difference is the increased number of possible protocols using the equiangular spherical codes. With unbiased bases Alice and Bob have the choice of using anywhere from 2 to (possibly) d+1 bases. Spherical codes offer more possibilities, as n may range from d+1 to $d^2$ and m from 0 to n−2. This offers two advantages. The first is speed. In particular there are protocols involving fewer than 2 d signals, the minimum for the unbiased bases. This translates into higher absolute key generation rates, the key generation rate times the success rate. Suppose Alice and Bob use n=αd spherical code states. Then the maximum key generation rate becomes $\log(d)/\alpha + (\alpha-1)/\alpha \log((\alpha-1)/\alpha)$ for large d, in contrast to at best log(d)/2 for unbiased bases. By choosing α<2 Alice and Bob can find spherical codes faster than two unbiased bases. For example, consider 35 spherical code states in 25 dimensions. The key rate is roughly 3.4 bits per signal as compared to 2.3 for two unbiased bases.

Figure 4:
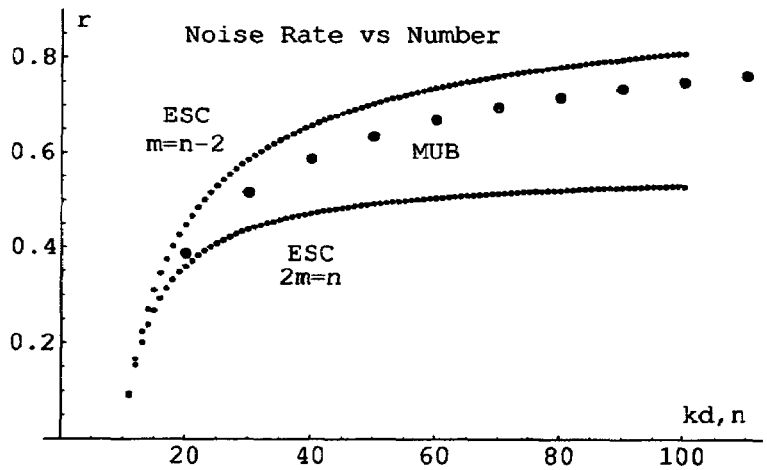
FIG. 4 shows maximum tolerable noise rate in the depolarizing channel as a function of number of elements in the equiangular spherical code (n) and mutually-unbiased bases (kd) ensembles.

The second advantage is security. Increasing m is similar to increasing the number of unbiased bases in that both lead to decreased key rate and increased maximum tolerable noise. For maximum security Bob may elect to announce all but two of the outcomes he didn't obtain, whereas for maximum speed Bob should choose m=0. FIG. 4 shows the maximum tolerable noise rate for two values of m, as a function of number of signal states in ten dimensions. The corresponding maximum error rate when using various numbers of unbiased bases is included for comparison. The case of m=n−2 always yields improved security over unbiased bases.

FIG. 4 shows maximum tolerable noise rate in the depolarizing channel as a function of number of elements in the equiangular spherical code (n) and mutually-unbiased bases (kd) ensembles, each in d=10 dimensions. Two ESC protocols are shown, above and below the MUB protocol. The upper curve corresponds to the maximal security case m=n−2 in which Bob excludes all but two outcomes, while the lower corresponds to m=n/2, exclusion of half the outcomes. The flexibility in number of elements n and number of outcomes publicly excluded m provides an increased level of security over unbiased bases.

Figure 5:
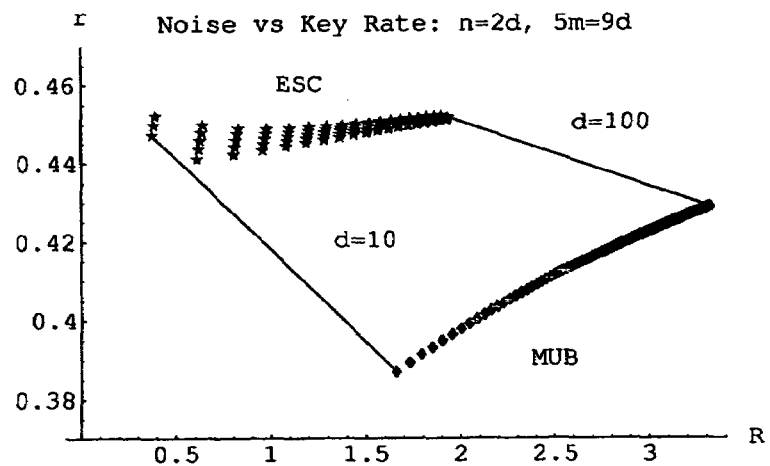
FIG. 5 shows speed/security pairs for ESC and MUB protocols using n=2 d signals.

These two advantages hold when considering all possible ESC protocols in a fixed dimension and so are appropriate if only the dimension is constrained by the particular hardware Alice and Bob wish to use. However, a direct comparison of the two protocols involves the tradeoff between speed and security for a fixed number of states in a given dimension. When using spherical code protocols, Alice and Bob are free to choose m to match the perceived error rate in the channel, so for each style of signal ensemble, fixing n and d specifies a concrete physical setup with similar resources. For each protocol the pair consisting of maximum key generation rate and the maximum tolerable error rate may be considered. Plotting the pairs for protocols having n signals in various dimensions the tradeoff for the two protocols may be determined. FIG. 5 reveals that for n=2 d signals, the spherical code protocols offer more security (larger vertical values) but at the price of slower key generation (smaller horizontal values).

FIG. 5 shows speed/security pairs for ESC and MUB protocols using n=2 d signals. Each point represents the maximum key generation rate (horizontal axis) and maximum tolerable noise rate for the depolarizing channel (vertical axis) for that particular protocol. The three lines connect corresponding protocols between the two different signal ensembles and show that while the unbiased bases are faster for fixed n and d, the spherical codes are more robust.

Use of spherical codes has been applied here to a specific model of quantum key distribution. However, they are immediately applicable to two variants of the "prepare & measure" protocol discussed here. First is the coherent version of such protocols in which Alice prepares a bipartite state, ostensibly entangled, and sends half to Bob. Each party then measures his or her half, returning the protocol to the original picture. This method allows one to bring not only classical but quantum information processing tools to bear on the problem of security. Equiangular spherical codes fit nicely into this framework, as they can always be realized from maximally entangled states. Thus they start on the same footing as unbiased bases, for which this is also true. To demonstrate this, consider a spherical code C={|ϕ_κ⟩} and a "conjugate" code C*={|ϕ_κ*⟩} formed by complex conjugating each code state in the standard basis. Then it is a simple matter to show that $$|\Phi\rangle = \left(\sqrt{d/n} \sum_\kappa |\phi_\kappa\rangle|\phi_\kappa^*\rangle\right)$$

is maximally entangled. Thus if Alice prepares this state and sends the second half to Bob, they can realize the "prepare-and-measure" scheme by measurement.

Second, the full array of $d^2$ equiangular states is a tomographically-complete ensemble, like the full complement of $d+1$ unbiased bases. Such sets are useful in a modified protocol in which Eve, instead of Alice, creates bipartite states and distributes one half to each of the two parties, and as a test to ensure secret key generation is possible. Now Alice and Bob need to perform quantum state tomography on their pieces to ensure the security of the protocol. Using the $d^2$ equiangular states again offers more security in this case.

Investigating the intercept/resend attack yields an insight into how the spherical codes ultimately perform in comparison with unbiased bases, when the strongest eavesdropping attacks are considered. The spherical codes' flexibility in n and m leads to advantages in both speed and security, though not together in any one instance, all the while rendering unnecessary the procedure of sacrificing key letters to determine the error rate. For fixed resources, i.e., fixed number of states in a given dimension, spherical codes offer more security, but slower key generation rates.

This hindrance may be possible to overcome, or at least ameliorate, for Bob's use of Alice's spherical code is almost certainly not his best choice. That is, assuming that the secrecy capacity will increase with increasing classical capacity of the quantum channel, Bob's optimal measurement is likely not the spherical code used by Alice. This is evident in two dimensions for the two spherical codes, which may be considered in the Bloch-sphere representation as a regular tetrahedron and three equally-spaced coplanar vectors. By inverting each vector in the ensemble the resulting combination of spherical code encoder and inverse spherical code decode achieves a higher classical capacity. In the case of the trine this is known to be the optimal measurement and conjectured to be for the tetrahedron. The same is true in three dimensions, at least for the case of six equiangular states: an unenlightening numerical maximization produced the result that a unitarily-transformed version of the encoding spherical code yields a capacity of 0.638 [the global maximization was carried out using Mathemation's NMaximize function], a roughly 50% improvement over the nominal capacity of 0.424 when using the same ensemble for encoding and decoding. This improvement doesn't surpass the capacity generated by using two unbiased bases, $\log[3]/2 \approx 0.792$, but narrows the gap.

Figure 6:
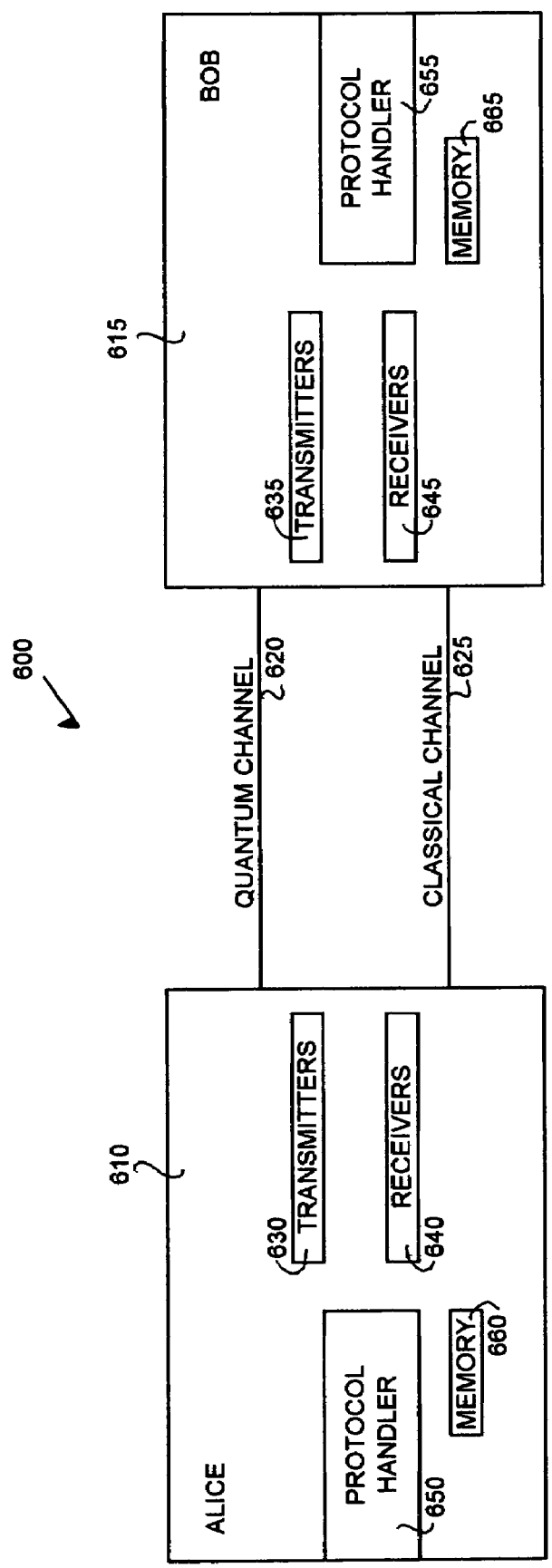
FIG. 6 illustrates a network in which Alice and Bob establish a secret key to encrypt and share data using quantum signals represented by an equiangular spherical code and using classical signals in authenticating the key

FIG. 6 illustrates a network 600 in which Alice and Bob establish a secret key to encrypt and share data using quantum signals represented by an equiangular spherical code and using classical signals in authenticating the key. Network 600 includes system 610 (Alice) and system 615 (Bob) in communication through quantum channel 620 and classical channel 625. System 610 and system 615 operate to perform various embodiments for quantum key distribution. System 610 includes transmitters 630 and receivers 640 to couple to quantum channel 620 and classical channel 625. System 615 includes transmitters 635 and receivers 645 to couple to quantum channel 620 and classical channel 625. Since either Alice or Bob may initiate communication, each system 610 and system 615 may be configured similarly.

System 610 includes a protocol handler 650 and system 615 includes a protocol handler 655. Protocol handler 650 and protocol handler 655 may be configured to manage the establishment of a secret key to encrypt and share data using quantum signals represented by an equiangular code and using classical signals in authenticating the key according to the teachings of the embodiments herein. System 610 may include memory 660 and system 615 may include memory 665. Memory 660 and memory 665 may be used to provide computer-executable instructions for performing embodiments to establish a secret key to encrypt and share data using quantum signals represented by an equiangular spherical code and using classical signals in authenticating the key. Various embodiments or combination of embodiments for apparatus and methods for establishing a secret key to encrypt and share data using quantum signals represented by an equiangular spherical code and using classical signals in authenticating the key may be realized in hardware implementations, software implementations, and combinations of hardware and software implementations. These implementations may include a computer-readable medium to store instructions which, when performed by a machine, cause the machine to establish a secret key with another machine in accordance with various embodiments of protocols for quantum key distribution. The computer-readable medium is not limited to any one type of medium. The computer-readable medium used will depend on the application using an embodiment.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. A method comprising:
generating a first raw key to establish a key to encrypt and share data;
transmitting quantum signals using a transmitter represented by an equiangular spherical code, the equiangular spherical code having a dimension greater than or equal to 3, the first raw key determining the encoding of each quantum signal;
generating a second raw key from outcomes of a measurement of received quantum signals from transmitting the quantum signals;
transmitting classical signals to partially reveal an identity of values of the first raw key;
modifying the first raw key and the second raw key based on the classical signals such that modifying the first raw key and the second raw key provides a measure of a noise rate; and
applying the measure of the noise rate to the first raw key and to the second raw key to generate the key.

2. The method of claim 1, wherein transmitting classical signals to partially reveal an identity of values of the first raw key includes transmitting classical signals for each quantum signal providing a set of values not in the first raw key.

3. The method of claim 1, wherein transmitting classical signals to partially reveal an identity of values of the first raw key includes transmitting classical signals for each quantum signal providing a plurality of possible values in the first raw key.

4. The method of claim 1, wherein generating a second raw key from outcomes of a measurement includes generating the second raw key from outcomes of a measurement to identify directly values of the first raw key.

5. The method of claim 1, wherein generating a second raw key from outcomes of a measurement includes generating the second raw key from outcomes of a measurement to eliminate potential values for identifying the first raw key.

6. The method of claim 1, wherein the method includes applying a hash function after applying the measure of the noise rate to the first raw key and to the second raw key.

7. A method comprising:
   transmitting quantum signals using a transmitter represented by an equiangular spherical code, the equiangular spherical code having a dimension greater than or equal to 3, the quantum signals encoded using a raw key;
   transmitting classical signals to partially reveal an identity of values of the raw key;
   modifying the raw key based on errors identified using the classical signals such that modifying the raw key provides a measure of a noise rate; and
   applying the measure of the noise rate to the raw key to establish a key to encrypt and share data.

8. The method of claim 7, wherein transmitting classical signals to partially reveal an identity of values of the raw key includes transmitting classical signals for each quantum signal providing a set of values not in the raw key.

9. The method of claim 7, wherein transmitting classical signals to partially reveal an identity of values of the first raw key includes transmitting classical signals for each quantum signal providing a plurality of possible values in the raw key.

10. The method of claim 7, wherein the method includes applying a hash function after applying the measure of the noise rate to the raw key.

11. A method comprising:
    acquiring received quantum signals from transmitted quantum signals represented by an equiangular spherical code, the equiangular spherical code having a dimension greater than or equal to 3, each transmitted quantum signal encoded using a first raw key;
    generating a second raw key from outcomes of a measurement on the received quantum signals;
    receiving classical signals using a receiver to partially reveal an identity of values of the first raw key;
    modifying the second raw key based on errors identified using the classical signals such that modifying the second raw key provides a measure of a noise rate; and
    applying the measure of the noise rate to the second raw key to establish a key to encrypt and share data.

12. The method of claim 11, wherein receiving classical signals to partially reveal an identity of values of the first raw key includes receiving classical signals for each quantum signal providing a set of values taken not to be in the first raw key.

13. The method of claim 11, wherein receiving classical signals to partially reveal an identity of values of the first raw key includes receiving classical signals for each quantum signal providing a plurality of possible values in the first raw key.

14. The method of claim 11, wherein generating a second raw key from outcomes of a measurement includes generating the second raw key from outcomes of a measurement to identify directly values of the first raw key.

15. The method of claim 11, wherein generating a second raw key from outcomes of a measurement includes generating the second raw key from outcomes of a measurement to eliminate potential values for identifying the first raw key.

16. The method of claim 11, wherein the method includes applying a hash function after applying the measure of the noise rate to the second raw key.

17. A computer-readable storage medium having computer-executable instructions for performing a method comprising:
    transmitting quantum signals represented by an equiangular spherical code, the equiangular spherical code having a dimension greater than or equal to 3, the quantum signals encoded using a raw key;
    transmitting classical signals to partially reveal an identity of values of the raw key;
    modifying the raw key based on errors identified using the classical signals such that modifying the raw key provides a measure of a noise rate; and
    applying the measure of the noise rate to the raw key to establish a key to encrypt and share data.

18. The computer-readable storage medium of claim 17, wherein transmitting classical signals to partially reveal an identity of values of the raw key includes transmitting classical signals for each quantum signal providing a set of values not in the raw key.

19. The computer-readable storage medium of claim 17, wherein the method includes applying a hash function after applying the measure of the noise rate to the raw key.

20. A computer-readable storage medium having computer-executable instructions for performing a method comprising:
    acquiring received quantum signals from transmitted quantum signals represented by an equiangular spherical code, the equiangular spherical code having a dimension greater than or equal to 3, each transmitted quantum signal encoded using a first raw key;
    generating a second raw key from outcomes of a measurement on the received quantum signals;
    receiving classical signals to partially reveal an identity of values of the first raw key;
    modifying the second raw key based on errors identified using the classical signals such that modifying the second raw key provides a measure of a noise rate; and
    applying the measure of the noise rate to the second raw key to establish a key to encrypt and share data.

21. The computer-readable storage medium of claim 20, wherein receiving classical signals to partially reveal an identity of values of the first raw key includes receiving classical signals for each quantum signal providing a set of values taken not to be in the first raw key.

22. The computer-readable storage medium of claim 20, wherein receiving classical signals to partially reveal an identity of values of the first raw key includes receiving classical signals for each quantum signal providing a plurality of possible values in the first raw key.

23. The computer-readable storage medium of claim 20, wherein generating a second raw key from outcomes of a measurement includes generating the second raw key from outcomes of a measurement to identify directly values of the first raw key.

24. The computer-readable storage medium of claim 20, wherein generating a second raw key from outcomes of a measurement includes generating the second raw key from outcomes of a measurement to eliminate potential values for identifying the first raw key.

25. The computer-readable storage medium of claim 20, wherein the method includes applying a hash function after applying the measure of the noise rate to the second raw key.

26. A system comprising:
    a first transmitter to transmit quantum signals;
    a second transmitter to transmit classical signals; and
    a protocol handler, the protocol handler configured to:

operate in conjunction with the first transmitter to transmit the quantum signals represented by an equiangular spherical code, the equiangular spherical code having a dimension greater than or equal to 3, the quantum signals encoded using a raw key;

operate in conjunction with the second transmitter to transmit the classical signals to partially reveal an identity of values of the raw key;

modify the raw key based on errors identified using the classical signals such that modifying the raw key provides a measure of a noise rate; and apply the measure of the noise rate to the raw key to establish a key to encrypt and share data.

27. The system of claim 26, wherein the protocol handler configured to operate in conjunction with the second transmitter to transmit the classical signals includes the protocol handler configured to operate in conjunction with the second transmitter to transmit classical signals for each quantum signal to provide a set of values not in the raw key.

28. The system of claim 26, wherein the protocol handler is configured to apply a hash function responsive to application of the measure of the noise rate to the raw key.

29. A system comprising:

a first receiver to provide received quantum signals from transmitted quantum signals represented by a equiangular spherical code, the equiangular spherical code having a dimension greater than or equal to 3, each transmitted quantum signal encoded using a first raw key;

a second receiver to acquire classical signals; and a protocol handler, the protocol handler configured to:

generate a second raw key from outcomes of a measurement on the received quantum signals;

to process the classical signals to partially reveal an identity of values of the first raw key;

to modify the second raw key based on errors identified from the classical signals and to provide a measure of a noise rate based on errors identified from the classical signals; and to apply the measure of the noise rate to the second raw key to establish a key to encrypt and share data.

30. The system of claim 29, wherein the protocol handler configured to process the classical signals to partially reveal an identity of values of the first raw key includes the protocol handler configured to process the classical signals for each quantum signal to providing a set of values taken not to be in the first raw key.

31. The system of claim 29, wherein the protocol handler configured to generate a second raw key from outcomes of a measurement includes the protocol handler configured to generate a second raw key from outcomes of a measurement to identify directly values of the first raw key.

32. The system of claim 29, wherein the protocol handler configured to generate a second raw key from outcomes of a measurement includes the protocol handler configured to generate a second raw key from outcomes of a measurement to eliminate potential values for identifying the first raw key.

33. The system of claim 29, wherein the protocol handler is configured to apply a hash function responsive to application of the measure of the noise rate to the second raw key.

* * * * *

UNITED STATES PATENT AND TRADEMARK OFFICE
CERTIFICATE OF CORRECTION

PATENT NO. : 7,653,199 B2  Page 1 of 1
APPLICATION NO. : 11/194092
DATED : January 26, 2010
INVENTOR(S) : Joseph M. Renes It is certified that error appears in the above-identified patent and that said Letters Patent is hereby corrected as shown below:

In column 28, line 39, in Claim 1, delete "using a transmitter" and insert -- , using a transmitter, --, therefor.

In column 29, line 9, in Claim 7, delete "using a transmitter" and insert -- , using a transmitter, --, therefor.

In column 29, line 40, in Claim 11, delete "using a receiver" and insert -- , using a receiver, --, therefor.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,199 B2 | Page 1 of 1 |
| APPLICATION NO. | : 11/194092 | |
| DATED | : January 26, 2010 | |
| INVENTOR(S) | : Joseph M. Renes | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1155 days.

Signed and Sealed this

Twenty-third Day of November, 2010

David J. Kappos
*Director of the United States Patent and Trademark Office*